US011381350B2

(12) United States Patent
Olivella et al.

(10) Patent No.: US 11,381,350 B2
(45) Date of Patent: Jul. 5, 2022

(54) COMMUNICATION DEVICE AND METHOD FOR RECEIVING DATA

(71) Applicant: Intel Corporation, Santa Clara, CA (US)

(72) Inventors: Joan Anton Olivella, Munich (DE); Axel Huebner, Taufkirchen (DE); Tudor Ninacs, Munich (DE)

(73) Assignee: INTEL CORPORATION, Santa Clara, CA (US)

( * ) Notice: Subject to any disclaimer, the term of this patent is extended or adjusted under 35 U.S.C. 154(b) by 94 days.

(21) Appl. No.: 16/792,899

(22) Filed: Feb. 18, 2020

(65) Prior Publication Data
US 2020/0304249 A1 Sep. 24, 2020

(30) Foreign Application Priority Data

Mar. 19, 2019 (EP) .................................... 19163673

(51) Int. Cl.
*H04L 1/18* (2006.01)
*H04L 1/00* (2006.01)

(52) U.S. Cl.
CPC ............ *H04L 1/1845* (2013.01); *H04L 1/005* (2013.01); *H04L 1/1812* (2013.01); *H04L 1/1835* (2013.01); *H04L 1/1854* (2013.01); *H04L 1/1861* (2013.01); *H04L 1/1864* (2013.01)

(58) Field of Classification Search
CPC ... H04L 1/1845; H04L 1/1835; H04L 1/1812; H04L 1/1816; H04L 1/005
See application file for complete search history.

(56) References Cited

U.S. PATENT DOCUMENTS

| 2018/0278368 | A1* | 9/2018  | Kim ....................... H04L 1/1812 |
| 2018/0367257 | A1* | 12/2018 | Li ........................... H04L 1/1845 |
| 2019/0319740 | A1* | 10/2019 | Etezadi ................. H04L 1/0047 |
| 2019/0394772 | A1* | 12/2019 | Li ....................... H04W 72/1289 |
| 2020/0195386 | A1* | 6/2020  | Marinier ............... H04L 1/1896 |
| 2020/0204312 | A1* | 6/2020  | Xu ....................... H04L 27/2602 |
| 2021/0194640 | A1* | 6/2021  | Froberg Olsson .... H04L 1/1819 |

OTHER PUBLICATIONS

Sony; "Considerations on Dynamic Resource Sharing for eMBB/URLLC in DL"; 3GPP TSG RAN WG1 NR Ad-Hoc Meeting Spokane USA; Jan. 16-20, 2017; 7 pages.
European search Report issued for corresponding European patent application EP 19 163 673.7 dated Sep. 3, 2019, 7 pages (for information purpose only).

* cited by examiner

*Primary Examiner* — Min Jung
(74) *Attorney, Agent, or Firm* — Viering, Jentschura & Partner MBB

(57) ABSTRACT

According to various examples, a communication device is described comprising a memory configured to store data received in one or more first transmissions of a transmission process according to a retransmission protocol, a receiver configured to receive a second transmission of data of the transmission process, a combiner configured to combine the data received in the second transmission with the data stored in the memory, a determiner configured to determine whether the second transmission was interfered by a communication resource deallocation and a controller configured to maintain data storage of the received data of the transmission process stored in the memory as received data of the transmission process if the second transmission was interfered by a communication resource deallocation.

19 Claims, 10 Drawing Sheets

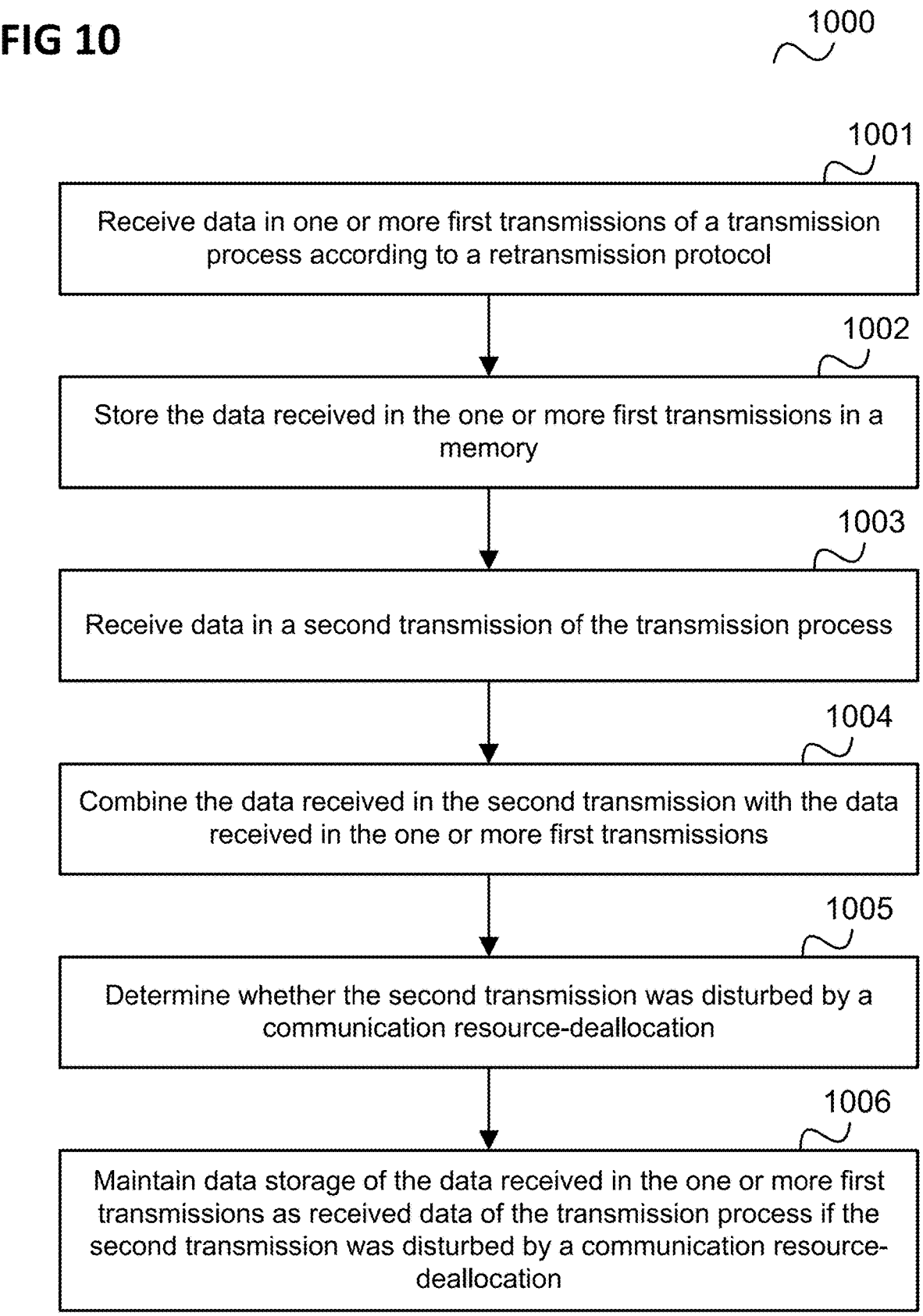

COMMUNICATION DEVICE AND METHOD FOR RECEIVING DATA

CROSS-REFERENCE TO RELATED APPLICATION

This application claims the benefit of priority from European Patent Application No. EP 19 163 673.7, filed on Mar. 19, 2019, the content of it being hereby incorporated by reference in its entirety for all purposes.

TECHNICAL FIELD

Exemplary implementations described herein generally relate to communication devices and methods for receiving data.

BACKGROUND

In a 5G (Fifth Generation) mobile communication system communication resources allocated for data transmission to a mobile terminal may be pre-empted to provide another mobile terminal with a high priority communication service. This allows ensuring quality requirements of the high priority communication service but may lead to performance degradation for the mobile terminal whose communication resources are pre-empted. Accordingly, approaches to reduce performance degradation caused by pre-emption of communication resources are desirable.

BRIEF DESCRIPTION OF THE DRAWINGS

In the drawings, the same reference characters generally refer to the same parts throughout the different views. The drawings are not necessarily to scale, emphasis instead generally being placed upon illustrating the principles of the invention. In the following description, various aspects are described with reference to the following drawings, in which:

FIG. 10 shows a flow diagram illustrating a method for receiving data, for example performed by a communication device, according to various examples.

DESCRIPTION OF EXEMPLARY IMPLEMENTATIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
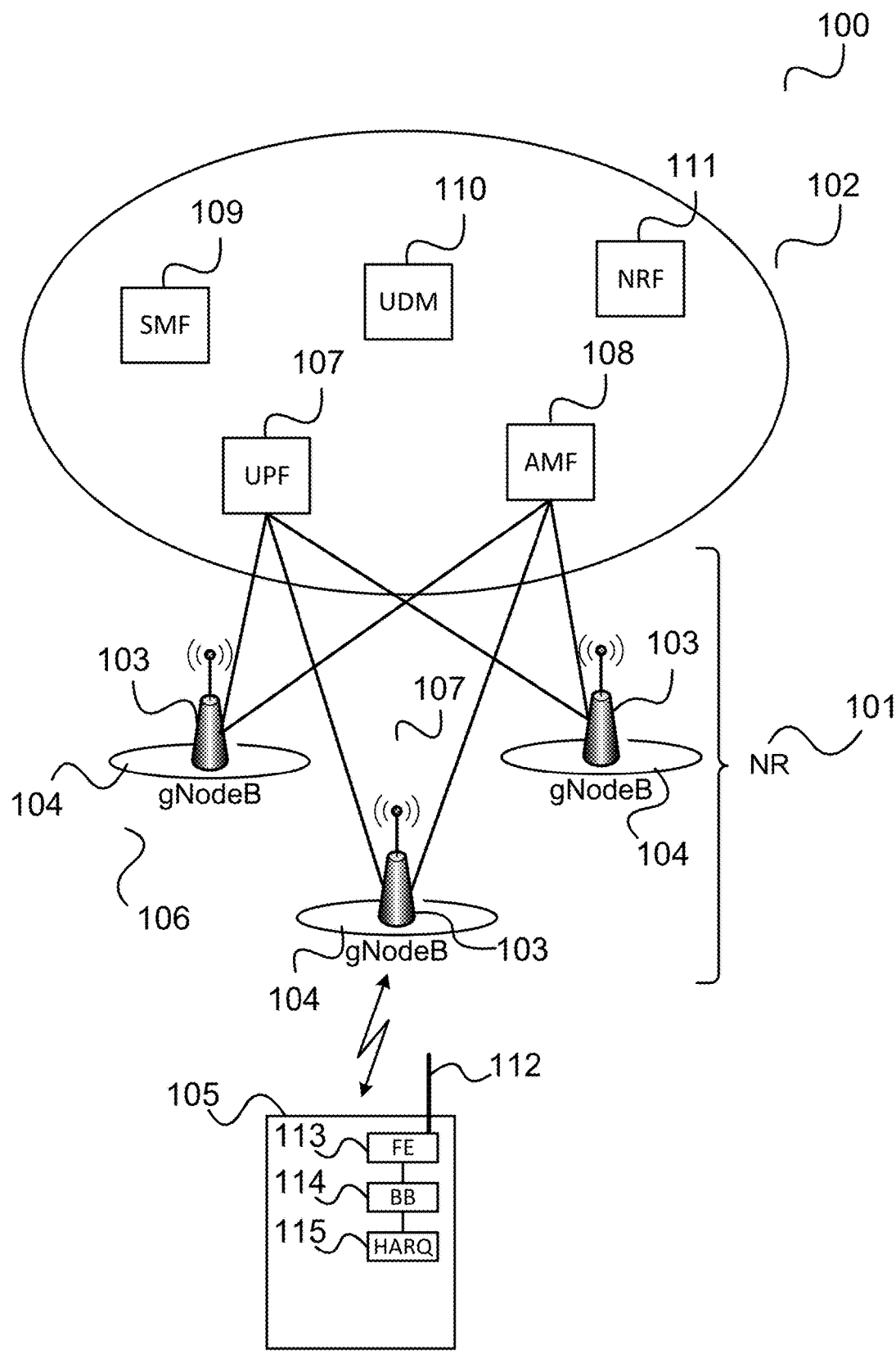
FIG. 1 shows a communication system, e.g. a 5G (Fifth Generation) communication system.

FIG. 1 shows a communication system 100, e.g. a 5G (Fifth Generation) communication system as specified by 3GPP (Third Generation Partnership Project).

The communication system 100 includes a radio access network (RAN, e.g. according to 5G NR (New Radio)) 101 and a core network (e.g. a 5G core) 102. The radio access network 101 may include base (transceiver) stations (e.g. gNodeBs according to 5G) 103. Each base station 103 provides radio coverage for one or more mobile radio cells 104 of the radio access network 101.

A mobile terminal (also referred to as UE, user equipment, or MS, mobile station) 105 located in one of the mobile radio cells 104 (in this example the middle radio cell 104) may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are connected to the core network, e.g. to an UPF (user plane function) 107 (e.g. via an NG3 interface) and an Access and Mobility Management Function (AMF) 108 (e.g. via an NG2 interface). The core network 102 includes further components such as a Session Management Function (SMF) 109, a Unified Data Management (UDM) 110 and a Network Repository Function (NRF) 111. The components of the core network 102 may be directly connected via various interfaces or may be connected via one or more of the other components.

To communicate via the air interface 106, the mobile terminal includes components like an antenna 112, a radio frontend 113, a baseband processor 114 and a HARQ (Hybrid Automatic Repeat Request) processor (or HARQ unit) 115.

For 5th Generation New Radio (5G NR) mobile communications, the International Telecommunication Union (ITU) has defined three service categories: Enhanced Mobile Broadband (eMBB), Ultra Reliable Low Latency Communications (URLLC), and Massive Machine-Type Communications (mMTC).

Ultra-Reliable and Low-Latency Communication (URLLC) is about services with low-latency and high reliability. These are services that are required to have the shortest response times and virtually no failure. Examples are automatic driver assistants, which automatically control motor vehicles, or the remote maintenance of plants.

In a communication system providing URLLC services, higher priority services may pre-empt other lower priority on-going services. For example, in an NR 101, a gNodeB 103 may pre-empt PDSCH (Physical Downlink Shared Channel) resources already assigned to a lower-priority service in order to serve a URLLC service. Pre-emption means that the communication resources (e.g. PDSCH resources in the present example) which are already assigned for a certain data transmission (to a data transmission of the lower priority service in this example) are de-allocated for re-allocation to another data transmission (to a data transmission of the URLLC service in this example). The pre-emption causes a performance degradation to the lower priority service (contemplated to use the pre-empted PDSCH resources). In some NR scenarios, pre-emption (whether pre-emption occurred or not) is signaled a posteriori.

Figure 2:
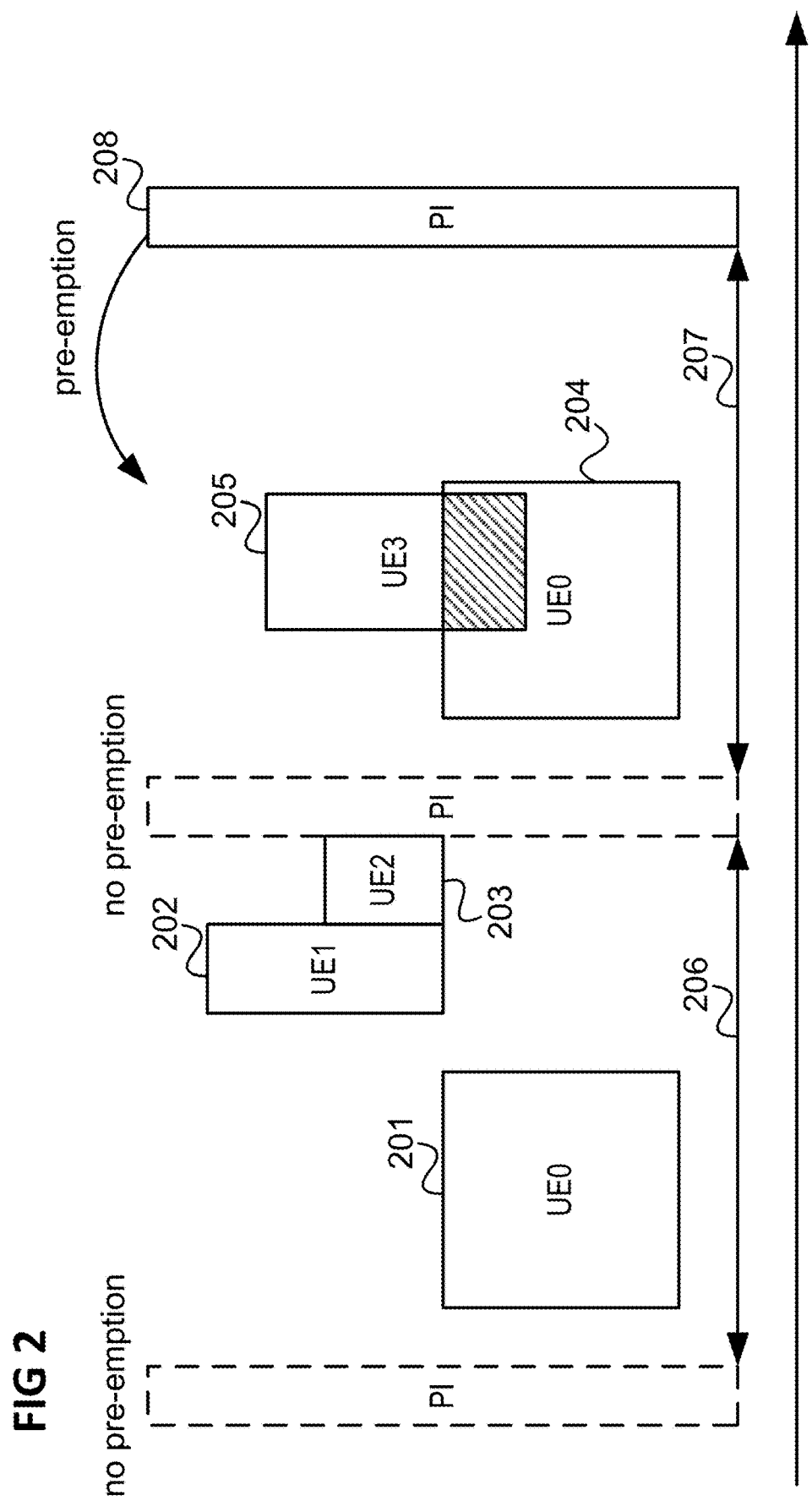
FIG. 2 illustrates pre-emption with a posteriori signaling.

FIG. 2 illustrates pre-emption with a posteriori signaling.

In FIG. 2, time flows from left to right and the radio resource (i.e. communication resource) allocation is indicated by boxes 201 to 205. A radio resource box 201 to 205 may for example correspond to an allocation of a certain frequency range (i.e. carriers) indicated by its height in vertical direction for a certain time indicated by its length in horizontal (i.e. time) direction.

First communication resources 201 are allocated to a first UE denoted "UE0", second communication resources 202 are allocated to a second UE denoted "UE1" and third communication resources 203 are allocated to a third UE denoted "UE2". The communication resources 201 to 203 are located in a first pre-emption period 206 and no pre-emption takes place so there is no pre-emption signaled at the end of the first pre-emption period 206.

In a second pre-emption period 207, however, a part of fourth communication resources 204 which originally had been allocated to UE0 are re-allocated to a fourth UE denoted UE3. This means that UE3 is allocated fifth communication resources 205 which overlap with the fourth communication resources 204, for example because UE3 uses a URLLC service which has priority over the service for which UE0 has been allocated the fourth communication resources 204. Thus, for example, the data which the UE0 receives (e.g. from a base station 203) in the overlap between the fourth communication resources 204 and the fifth communication resources 205 (shown hatched in FIG. 2) are not actually data intended for the UE0. Instead, they are for example data sent by the base station 103 to UE3. However, the UE0 only gets knowledge of this when a pre-emption indication 208 is sent at the end of the second pre-emption period 207, e.g. by base station 103.

At that time, UE0 may already have combined the data received via the communication resources in the overlap with earlier data (e.g. data received via the first communication resources 201), e.g. when it uses a HARQ process. Namely, in case a current transmission via the communication resources in the overlap is a retransmission in a HARQ process, UE0 may perform a combining operation with the original contents of a HARQ memory (i.e. the earlier data). Thus, the earlier data may be corrupted or at least its quality (regarding its capability to be decoded correctly) may be reduced. This results in performance degradation for UE0. The combination may for example be a combination of demodulated soft bits, typically log-likelihood ratios (LLRs), of the earlier data and the data received in via the overlapping communication resources.

Ideally, to minimize performance degradation caused by pre-emption of a lower priority service, the communication device receiving data for the lower priority service would zero those LLRs (Log-likelihood ratios) derived from received data affected by pre-emption.

However, zeroing LLRs has the drawback of complexity since it requires a second combining operation which is not feasible in most real time systems and exact mapping of preempted LLRs.

Alternatively, the communication device may flush those HARQ processes affected by pre-emption.

Flushing a HARQ process has a performance drawback since the whole history of transmissions and possible retransmissions for the HARQ process is lost. This may lead to failure of decoding when a maximum number of transmissions has been reached and may thus require higher layer retransmissions.

In the following, approaches to minimize or at least reduce the performance degradation caused by pre-emption are described.

According to various examples, two versions of HARQ process data are kept temporarily (a version with and a version without combining a current transmission) and once a pre-emption indication is signaled, the receiving communication device (e.g. UE 105) chooses which version of the HARQ process data is the best one and discards the other version.

By this approach, with respect to zeroing LLRs, a complexity reduction may be achieved and, in scenarios where full PDSCH code blocks are pre-empted, optimal performance can be achieved. With respect to flushing a HARQ process, a performance advantage can be achieved since the history of the HARQ process is not lost. This can be seen to come at the price of slightly more complex HARQ memory management.

For example, suppose that SNR (signal-to-noise ratio) is so that a PDSCH requires N retransmissions in average and suppose that a maximum of N+1 retransmissions are allowed (e.g. N=3). Suppose further that the Nth retransmission of the PDSCH is pre-empted. With high probability, a communication device using HARQ flushing will not be able to decode the data transmitted via the PDSCH after N+1 retransmissions. However, with high probability, a communication operating according to the approach described above (with two versions of HARQ process data) will be able to decode PDSCH after N+1 retransmissions.

Figure 3:
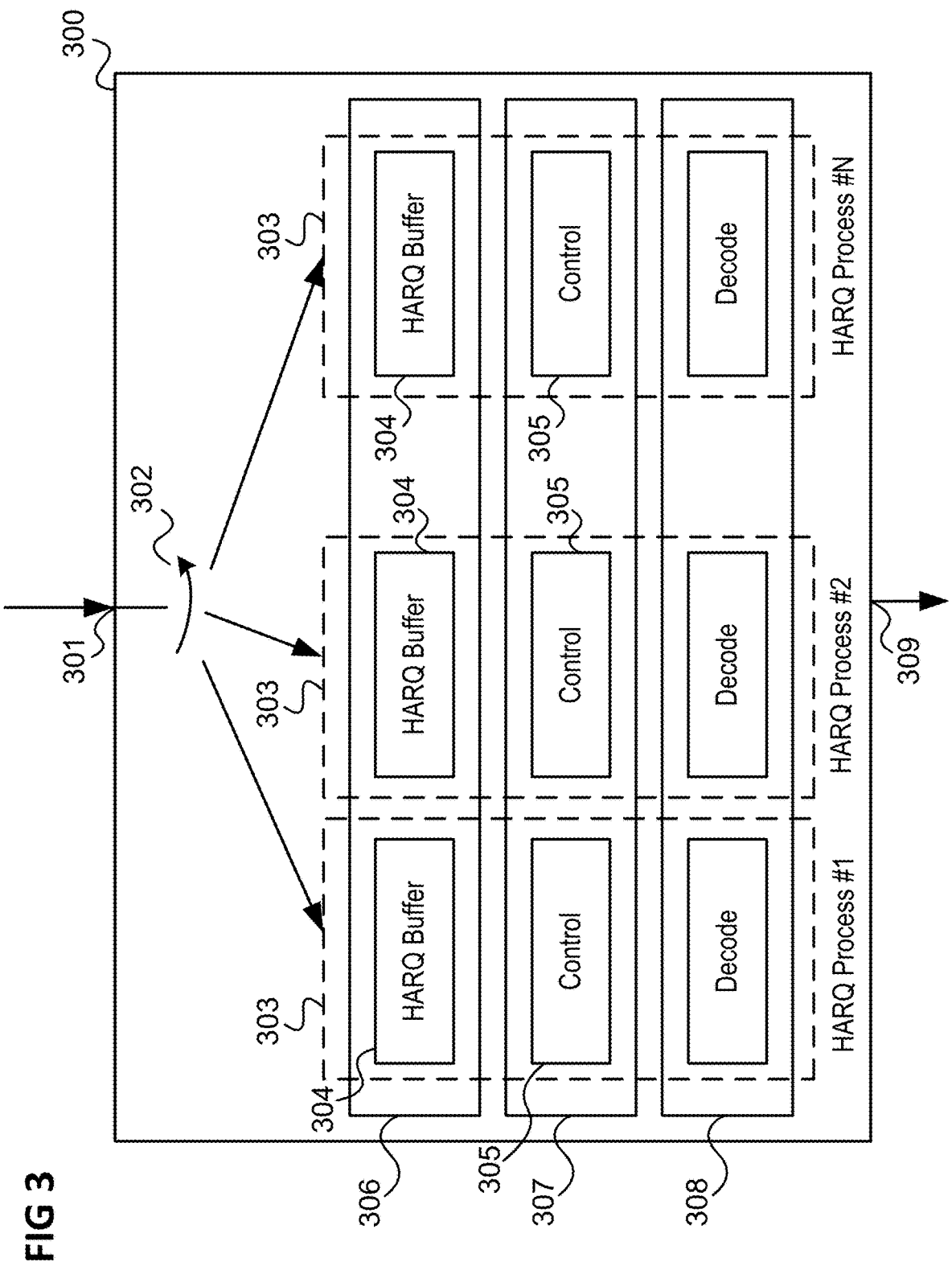
FIG. 3 shows a HARQ (Hybrid Automatic Repeat Request) unit.

In the following, typical HARQ processing, HARQ processing with HARQ flushing and a HARQ processing according to the approach described above with two versions of HARQ process data are described in the following with reference to FIGS. 4, 5 and 6, respectively, based on a HARQ unit as illustrated in FIG. 3.

FIG. 3 shows a HARQ unit 300.

The HARQ unit 300 for example corresponds to the HARQ unit 115 of the UE 105.

The HARQ unit 300 receives data received by the UE 105, for example from the baseband processor 114, via an input 301. The data is for example in the form of MAC PDUs (Medium Access Control Packet Data Units). A switch 302 distributes the received data to the corresponding HARQ processes 303. For each HARQ process 303, there is in particular a HARQ buffer 304 and corresponding control (e.g. controlling HARQ feedback etc.) 305. The HARQ buffers are implemented by a memory 306 of the HARQ unit 300 and the controls 305 are implemented by a controller 307 of the HARQ unit 300.

The HARQ unit 300 further includes a decoder 308 and an output 309 via which it outputs data which has been successfully decoded (i.e. passed error detection).

Figure 4:
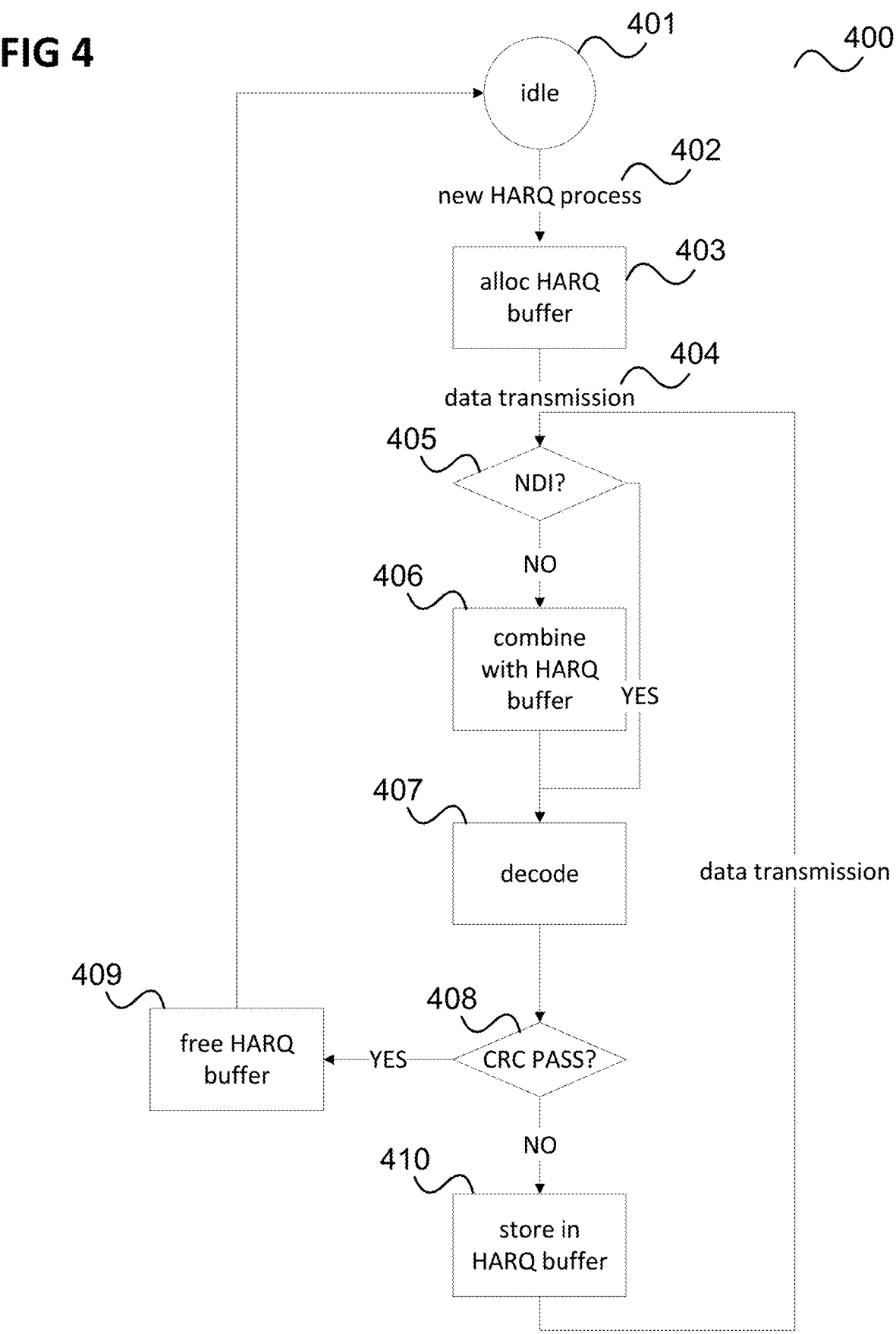
FIG. 4 shows a flow diagram illustrating a typical HARQ processing.

FIG. 4 shows a flow diagram 400 illustrating a typical HARQ processing.

The flow starts in an idle state 401.

In 402, a new HARQ process 303 is established. For example, the UE 105 including the HARQ unit 300 is to receive data from a base station 103.

In 403, a HARQ buffer 304 is allocated for the new HARQ process 303 in the memory 306.

In 404, data transmission is performed, e.g. the UE 105 receives data associated with the HARQ process 303.

In 405, it is checked whether new data has been received (which will be the case for the initial data transmission but may not be the case for later transmissions which may be retransmissions). If no new data has been received, i.e. the transmission of data has been a retransmission, the received data is combined with the content of the HARQ buffer 304 in 406. If new data has been received, the combination is skipped.

In 407, the decoder 308 decodes the received data or, as the case may be, the result of the combination.

In 408, it is checked by controller 307 whether the result of the decoding passes an error detection check, e.g. a CRC (cyclic redundancy check).

If the error detection check is passed, the decoded data is output via output 309 and the HARQ buffer is freed in 409.

If the error detection check is not passed, the received data or, as the case may be, the result of the combination is stored in the HARQ buffer in 410 and data transmission continues.

Figure 5:
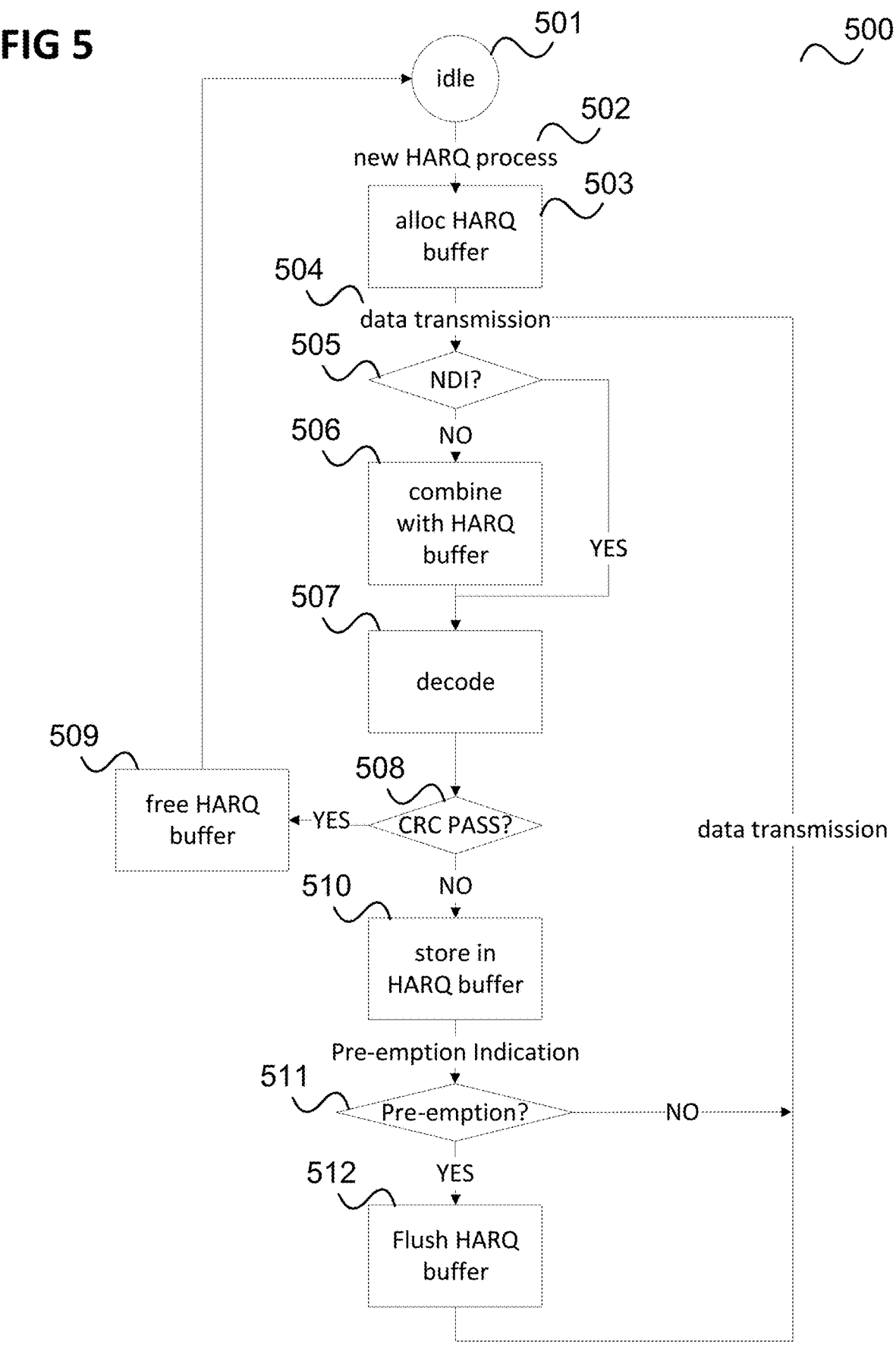
FIG. 5 shows a flow diagram illustrating a HARQ processing with HARQ buffer flushing in case of pre-emption.

FIG. 5 shows a flow diagram 500 illustrating a HARQ processing with HARQ buffer flushing in case of pre-emption.

The flow starts in an idle state 501.

In 502, a new HARQ process 303 is established. For example, the UE 105 including the HARQ unit 300 is to receive data from a base station 103.

In 503, a HARQ buffer 304 is allocated for the new HARQ process 303 in the memory 306.

In 504, data transmission is performed, e.g. the UE 105 receives data associated with the HARQ process 303.

In 505, it is checked whether new data has been received (which will be the case for the initial data transmission but may not be the case for later transmissions which may be retransmissions). If no new data has been received, i.e. the transmission of data has been a retransmission, the received data is combined with the content of the HARQ buffer 304 in 506. If new data has been received, the combination is skipped.

In 507, the decoder 308 decodes the received data or, as the case may be, the result of the combination.

In 508, it is checked by controller 307 whether the result of the decoding passes an error detection check, e.g. a CRC (cyclic redundancy check).

If the error detection check is passed, the decoded data is output via output 309 and the HARQ buffer is freed in 509.

If the error detection check is not passed, the received data or, as the case may be, the result of the combination is stored in the HARQ buffer in 510.

In 511, it is checked whether pre-emption has occurred, i.e. whether a pre-emption indication has been received by the UE 105.

If no pre-emption has occurred, the UE 105 continues data transmission.

If pre-emption has occurred, the HARQ buffer 304 is flushed in 512 and data transmission is continued.

Figure 6:
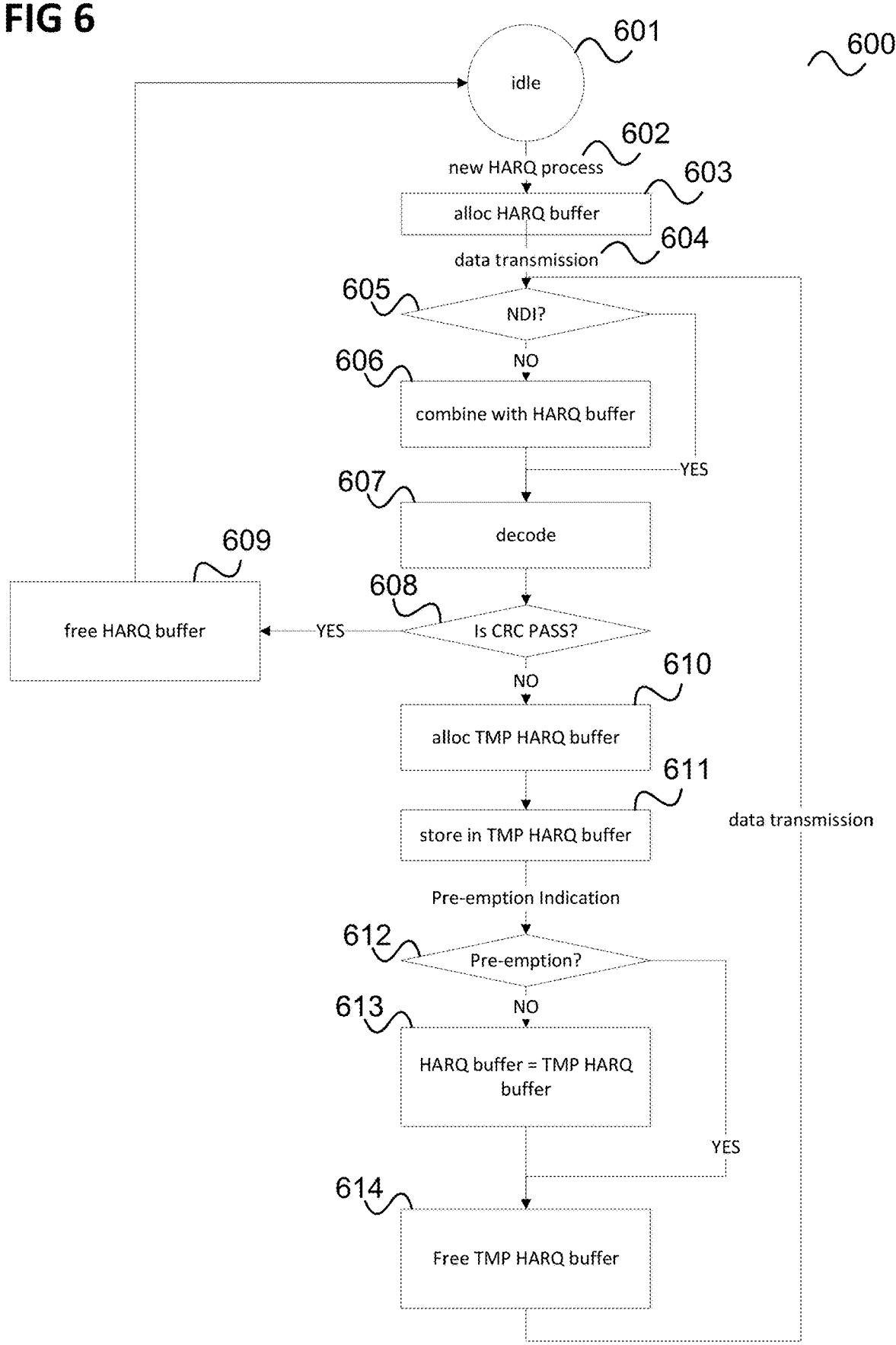
FIG. 6 shows a flow diagram illustrating a HARQ processing according to an example with two HARQ buffers for a HARQ process.

FIG. 6 shows a flow diagram 600 illustrating a HARQ processing according to an example with two HARQ buffers 304 for a HARQ process 303.

The flow starts in an idle state 601.

In 602, a new HARQ process 303 is established. For example, the UE 105 including the HARQ unit 300 is to receive data from a base station 103.

In 603, a HARQ buffer 304 is allocated for the new HARQ process 303 in the memory 306.

In 604, data transmission is performed, e.g. the UE 105 receives data associated with the HARQ process 303.

In 605, it is checked whether new data has been received (which will be the case for the initial data transmission but may not be the case for later transmissions which may be retransmissions). If no new data has been received, i.e. the transmission of data has been a retransmission, the received data is combined with the content of the HARQ buffer 304 in 606. This may for example be a combination of soft values (e.g. LLRs). If new data has been received, the combination is skipped.

In 607, the decoder 308 decodes the received data or, as the case may be, the result of the combination.

In 608, it is checked by controller 307 whether the result of the decoding passes an error detection check, e.g. a CRC (cyclic redundancy check).

If the error detection check is passed, the decoded data is output via output 309 and the HARQ buffer is freed in 609.

If the error detection check is not passed, a temporary (second) HARQ buffer is allocated in the memory 306 for the HARQ process 303 and in 611 the received data or, as the case may be, the result of the combination is stored in the temporary HARQ buffer.

In 612, it is checked whether pre-emption has occurred, i.e. whether a pre-emption indication has been received by the UE 105.

If no pre-emption has occurred, the content of the HARQ buffer is set to the content of the temporary HARQ buffer (e.g. be setting the temporary HARQ buffer to be the HARQ buffer of the HARQ process) in 613.

If pre-emption has occurred, this is skipped, i.e. the content of the HARQ buffer is kept the same. This means that the information of the newly received data is discarded.

In 614, the temporary HARQ buffer is freed (i.e. the corresponding memory area in the memory 306 is de-allocated) and data transmission is continued.

In summary, upon a PDSCH retransmission, the UE reads the HARQ buffer assigned to the current HARQ process from HARQ memory, combines it with the current transmission and, in case decoding is not successful, the UE stores the results back to HARQ memory. In the approaches as illustrated in FIGS. 4 and 5, the same HARQ buffer is used to store back the results after combining.

In contrast, according to the approach illustrated in FIG. 6, the combining results are not stored back to the same HARQ buffer in HARQ memory but a new location is allocated for them. This means that temporarily two HARQ buffers are stored in memory for the same HARQ process. Two HARQ buffers are temporarily allocated to the HARQ process until the pre-emption indication arrives. Upon reception of the pre-emption indication, the best HARQ buffer for the HARQ process can be chosen and the other HARQ buffer is freed up.

Figure 7:
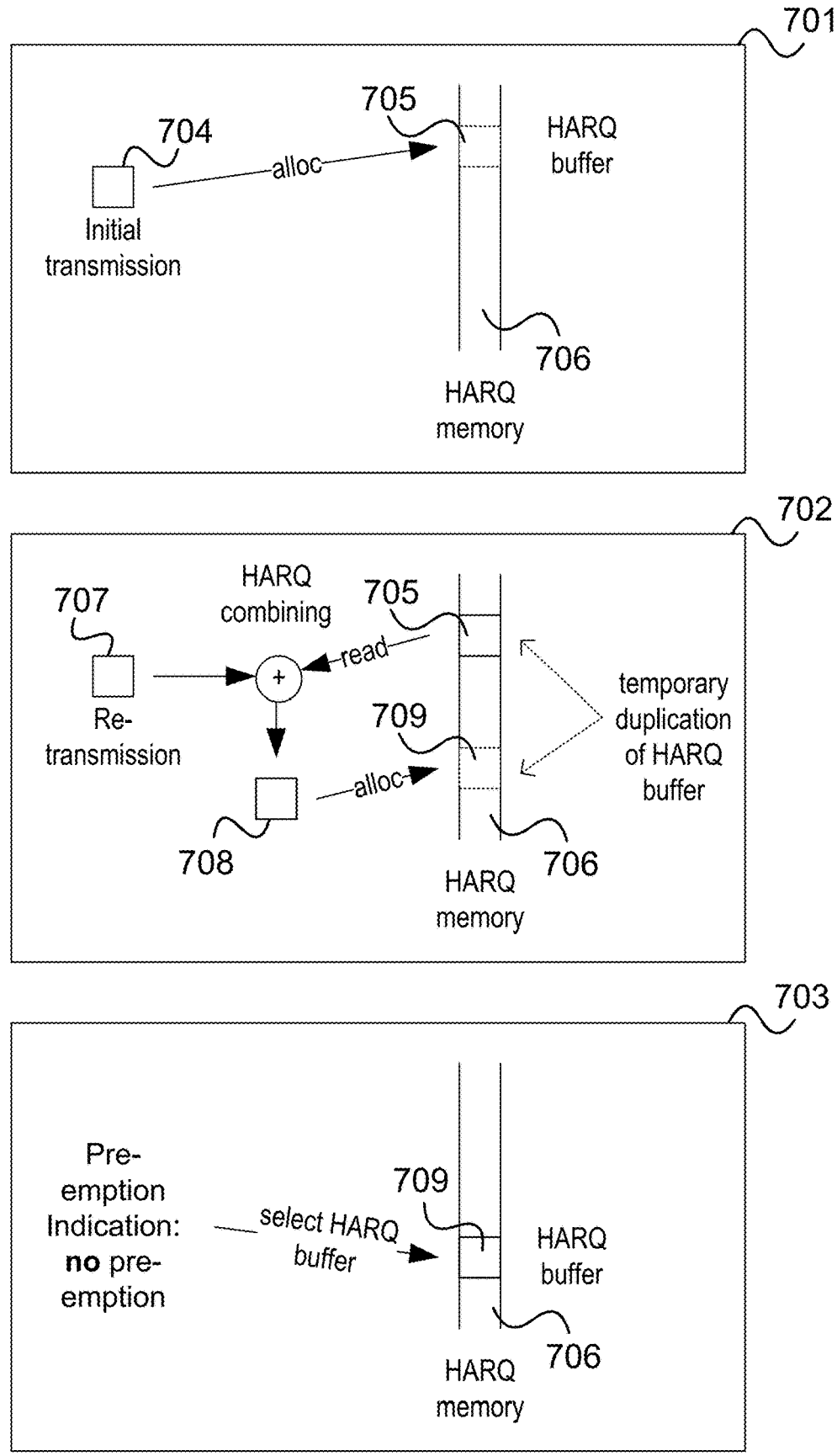
FIG. 7 illustrates the processing according to FIG. 6 when pre-emption does not take place.

FIG. 7 illustrates the processing according to FIG. 6 when pre-emption does not take place.

In a first stage 701, an initial transmission 704 is received by the UE and the received data is stored in a HARQ buffer 705 in HARQ memory 706.

In a second stage 702, the UE receives a retransmission 707. The data received in the retransmission is combined (according to 606) with the data of the initial transmission stored in HARQ buffer 705 to combined data 708. It is assumed in this example that the combined data 708 cannot be decoded to data that passes the CRC. Accordingly, the combined data 708 is stored according to 611 in a temporary HARQ buffer 709 allocated in HARQ memory 706.

In this example, no pre-emption indication is received (e.g. at the end of the pre-emption period during which the retransmission 707 took place, see FIG. 2). Therefore, in a third stage 703, the temporary HARQ buffer 709 is set to be the HARQ buffer from now on and the (old) HARQ buffer 705 is de-allocated. In other words, the combined data is kept as the data of the HARQ process. This can be seen as keeping the best HARQ buffer for the HARQ process.

Figure 8:
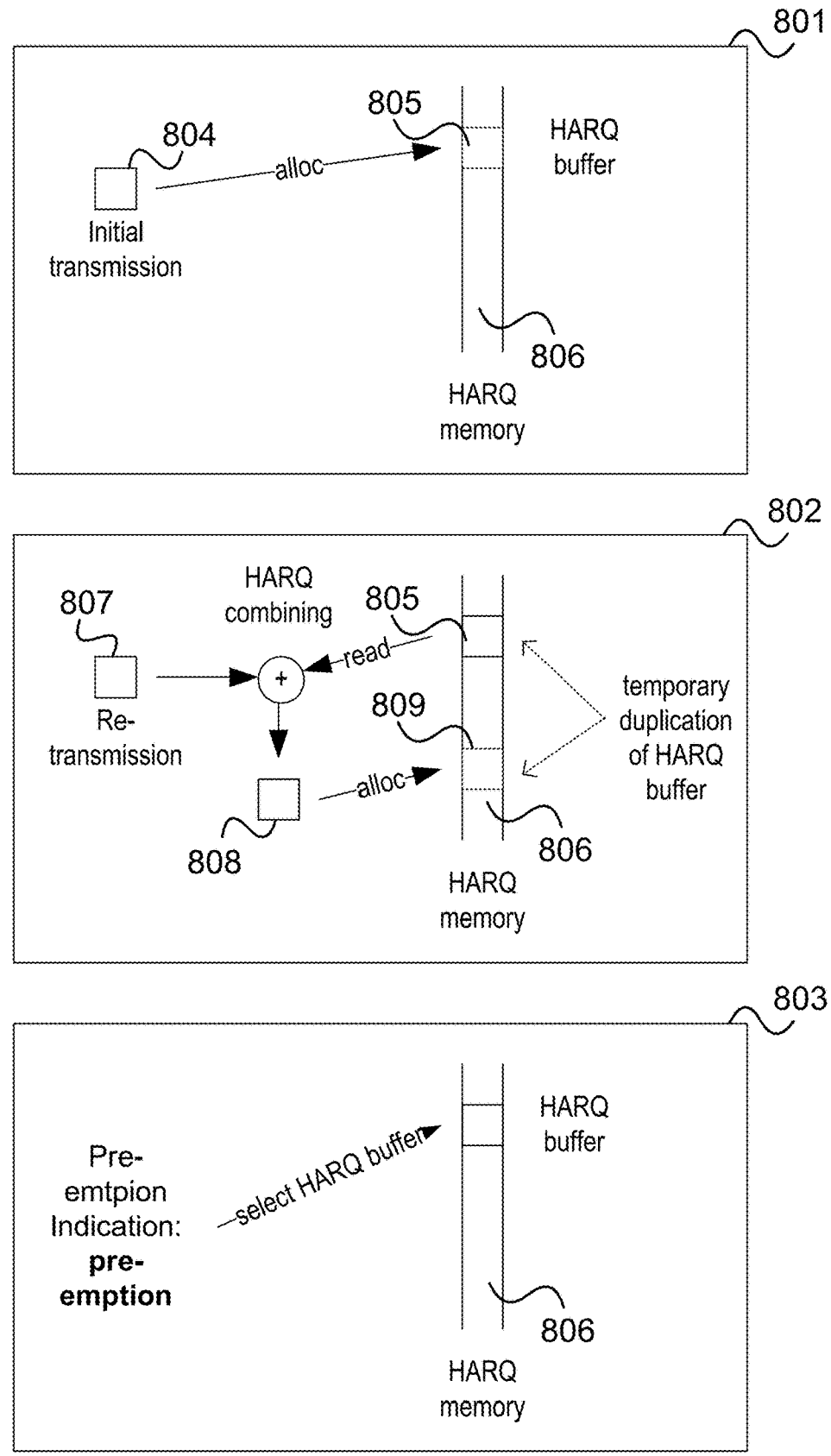
FIG. 8 illustrates the processing according to FIG. 6 when pre-emption does take place.

FIG. 8 illustrates the processing according to FIG. 6 when pre-emption does take place.

In a first stage 801, an initial transmission 804 is received by the UE and the received data is stored in a HARQ buffer 805 in HARQ memory 806.

In a second stage 802, the UE receives a retransmission 807. The data received in the retransmission is combined (according to 606) with the data of the initial transmission stored in HARQ buffer 805 to combined data 808. It is assumed in this example that the combined data 808 cannot be decoded to data that passes the CRC. Accordingly, the combined data 808 is stored according to 611 in a temporary HARQ buffer 809 allocated in HARQ memory 806.

In this example, a pre-emption indication is received (e.g. at the end of the pre-emption period during which the retransmission 807 took place, see FIG. 2). Therefore, in a third stage 803, the temporary HARQ buffer 809 is de-allocated and the HARQ buffer 805 continues to be the HARQ buffer. In other words, the data without the data received from the retransmission 804 is kept as the data of the HARQ process. This can be seen as keeping the best HARQ buffer for the HARQ process.

This process is then continued analogously for further retransmissions, i.e. the second stage 702, 802 and the third stage 803, 804 are repeated for further retransmissions until decoding has been successful and new data is transmitted.

It should be noted that the combination may mean a combination of soft bits (e.g. LLRs) for data for which both the initial transmission 704, 804 as well as the retransmission 707, 708 contain data. However, the case may occur that the data transmitted in the initial transmission 704, 804 and the data transmitted in the retransmission 707, 708 only partially overlap. Then, only the overlapping parts are combined.

It should further be noted that in a UE the HARQ memory is typically dimensioned for the worst case (e.g. maximum number of carriers or worst channel conditions). Therefore, in a common scenario, the HARQ memory 706, 806 is typically not fully utilized. This allows to temporarily keep double buffering for some HARQ processes. As explained above, once a pre-emption indication has been received, only the best HARQ buffer is kept for each of the received HARQ processes since the last pre-emption indication.

Figure 9:
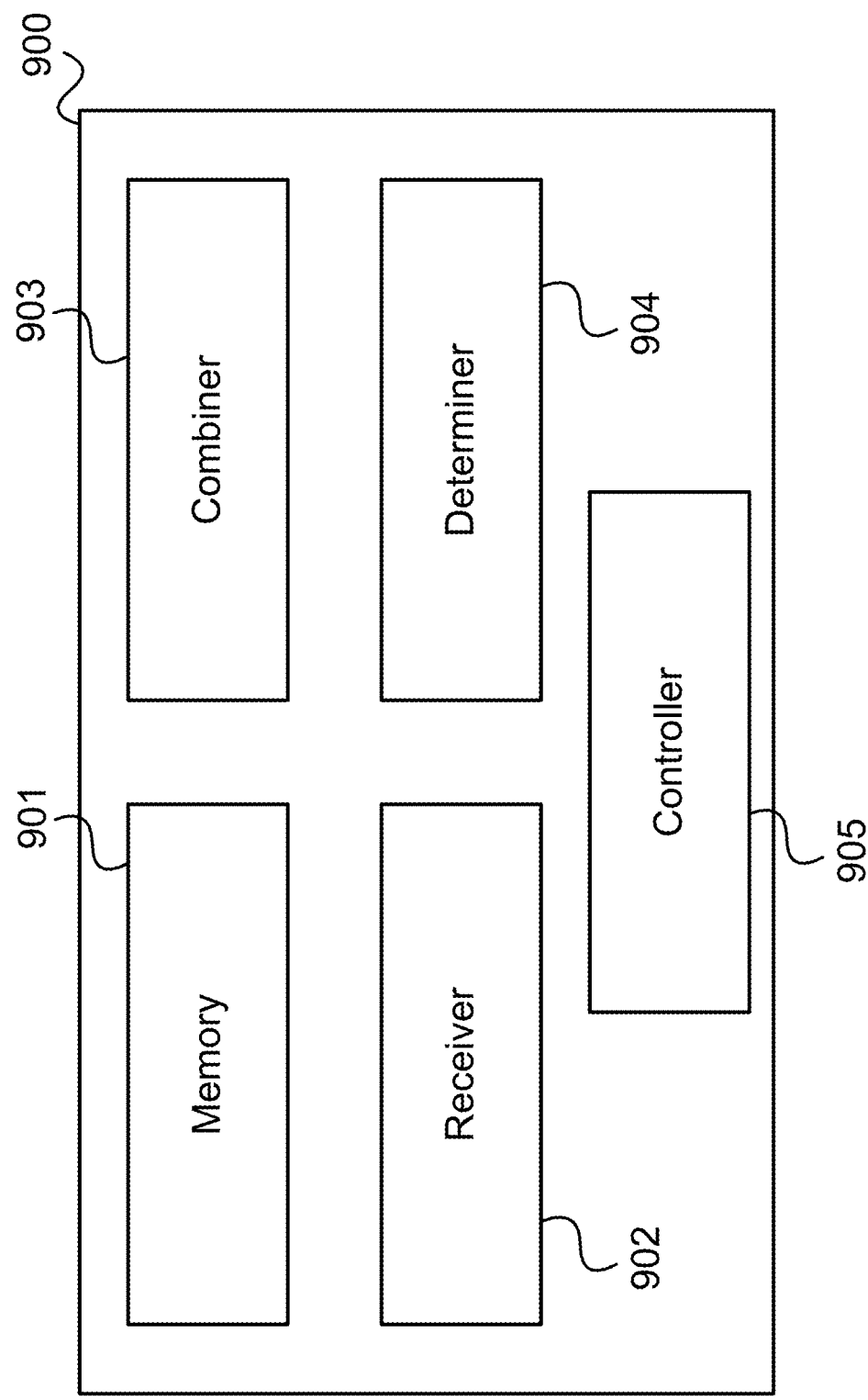
FIG. 9 shows a communication device according to various examples.

In summary, according to various examples, a communication device is provided as illustrated in FIG. 9.

FIG. 9 shows a communication device 900.

The communication device 900 includes a memory 901 configured to store data received in one or more first transmissions of a transmission process according to a retransmission protocol and a receiver 902 configured to receive a second transmission of data of the transmission process.

Further, the communication device 900 includes a combiner 903 configured to combine the data received in the second transmission with the data stored in the memory and a determiner 904 configured to determine whether the second transmission was interfered by a communication resource deallocation.

The communication device 900 further includes a controller 905 configured to maintain data storage of the received data of the transmission process stored in the memory (i.e. keeps the received data of the transmission process stored in the memory) as received data of the transmission process if the second transmission was interfered by a communication resource deallocation.

According to various examples, in other words, a communication device waits until it knows whether data received in a second retransmission (i.e. newly received data) have been influenced by pre-emption of communication resources and only when it has this knowledge decides whether to keep the information of the newly received data (if the second transmission was not influenced) or to discard it and revert to earlier data (if the second transmission was influenced). Until that decision, the communication device keeps data received earlier (without combination with the newly received data) such that it can revert to the earlier data and as well keeps the information of the newly received data, e.g. in form of a combination of the data received earlier with the newly received data.

If the data received in the second transmission together with the earlier data (received in the one or more first transmissions) are sufficient for decoding, the communication device may immediately perform decoding, i.e. there is no need for it to wait for information on whether the second transmission was interfered (i.e. disturbed, altered or influenced) by pre-emption. However, it is likely that in that case, the second transmission was not influenced by pre-emption because it allowed for successful decoding. In other words, according to various examples, the processing of the determiner and the controller is only carried out if the result of the combining by the combiner is not sufficient for successful decoding (e.g. such that the result of the decoding passes an error check such as a CRC check).

The communication device may be capable of combining additional transmissions (e.g. a third, fourth transmission and so on) with some or all available versions of the transmission process stored in memory, may be capable of storing the additional combined and non-combined results in memory, and may be capable of discarding several versions of the received data of the transmission process. This means that for each of one or more second transmissions of data of the transmission process, a result of combination with data stored in the memory may be stored, even before it has been decided whether the received data resulting from the combination of data received in an earlier second transmission is to be discarded. It may later be decided which version, i.e. the result of which combination is to be kept as received data of the transmission process.

The determiner may be configured to determine whether the second transmission was interfered by a communication resource deallocation based on whether the communication device has detected a resource deallocation, for example by analyzing channel properties, LLR properties, interference estimations, etc.

According to various examples method as illustrated in FIG. 10 is performed.

FIG. 10 shows a flow diagram 1000 illustrating a method for receiving data, for example performed by a communication device.

In 1001, the communication device receives (first) data in one or more first transmissions of a transmission process according to a retransmission protocol.

In 1002, the communication device stores the data received in the one or more first transmissions in a memory.

In 1003, the communication device receives (second) data in a second transmission of the transmission process.

In 1004, the communication device combines the data received in the second transmission with the data received in the one or more first transmissions.

In 1005, the communication device determines whether the second transmission was interfered by a communication resource deallocation.

In 1006, the communication device maintains data storage of the data received in the one or more first transmissions as received data of the transmission process if the second transmission was interfered by a communication resource deallocation. For example, in 1006, the communication device maintains data storage of the data received in the one or more first transmissions as received data of the transmission process in response to the second transmission being interfered by a communication resource deallocation.

The components of the communication device (such as in particular the combiner and the determiner) may for example be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which will be described in more detail below may also be understood as a "processor". The communication device may for example be at least partially implemented by a transceiver which may for example be at least partially implemented by a modem (e.g. an LTE modem), a baseband processor or other transceiver components or also by an application processor. The communication device may for example be a communication terminal as such and may include typical communication terminal devices such as a transceiver (including e.g. a baseband processor, one or more filters, transmit chains, receive chains, amplifiers etc.), an antenna, a subscriber identity module, an application processor, a memory etc.

The following examples pertain to further exemplary implementations.

Example 1 is a communication device as illustrated in FIG. 9.

In Example 2 the subject-matter of Example 1 may optionally include the controller being configured to store the result of the combining as received data of the transmission process in the memory if the second transmission was not interfered by a communication resource deallocation.

In Example 3 the subject-matter of Example 1 or 2 may optionally include the controller being configured to discard the result of the combining if the second transmission was interfered by a communication resource deallocation.

In Example 4 the subject-matter of any one of Examples 1 to 3 may optionally include the controller being configured to discard the received data of the transmission process stored in the memory if the second transmission was not interfered by a communication resource deallocation.

In Example 5 the subject-matter of any one of Examples 1 to 4 may optionally include the receiver being configured to receive one or more second transmissions of data of the transmission process and the combiner, the determiner and the controller being configured to, for each of the one or more second transmissions of data, combine the data received in the second transmission with the data stored in the memory; determine whether the second transmission was interfered by a communication resource deallocation; and maintain data storage of the received data of the transmission process stored in the memory as received data of the transmission process if the second transmission was interfered by a communication resource deallocation.

In Example 6 the subject-matter of any one of Examples 1 to 5 may optionally include the determiner being configured to determine whether the second transmission was interfered by a communication resource deallocation based on whether the communication device has received a communication resource deallocation message.

In Example 7 the subject-matter of any one of Examples 1 to 6 may optionally include the determiner being configured to determine whether the second transmission was interfered by a communication resource deallocation based on whether the communication device has detected a resource deallocation.

In Example 8 the subject-matter of Example 6 or 7 may optionally include the communication resource deallocation being a communication resource pre-emption and the communication resource deallocation message being a pre-emption indication.

In Example 9 the subject-matter of any one of Examples 1 to 8 may optionally include the second transmission being a retransmission according to the retransmission protocol.

In Example 10 the subject-matter of any one of Examples 1 to 9 may optionally include the retransmission protocol being a Hybrid Automatic Repeat Request protocol and the transmission process being a Hybrid Automatic Repeat Request process.

In Example 11 the subject-matter of any one of Examples 1 to 10 may optionally include the controller being configured to check whether the result of the combining is sufficient for decoding and free the memory from the received data of the transmission process if the result of the combining is sufficient for decoding.

In Example 12 the subject-matter of any one of Examples 1 to 11 may optionally include the controller being configured to check whether the result of the combining is sufficient for decoding by decoding the result of the combining and checking whether result of the decoding fulfills an error detection criterion.

In Example 13 the subject-matter of any one of Examples 1 to 12 may optionally include the combiner being configured to store the result of the combining in a further memory and the controller being configured to free the further memory if the second transmission was interfered by a communication resource deallocation.

In Example 14 the subject-matter of Example 13 may optionally include the memory being a transmission process buffer and the further memory being a temporary transmission process buffer.

In Example 15 the subject-matter of Example 12 may optionally include the controller being configured to set the temporary transmission process buffer as the transmission process buffer if the second transmission was not interfered by a communication resource deallocation.

In Example 16 the subject-matter of any one of Examples 1 to 15 may optionally include the communication device being a mobile terminal of a mobile communication system and the one or more first transmissions and the second transmissions being transmissions via a downlink channel of the mobile communication system.

In Example 17 the subject-matter of any one of Examples 1 to 16 may optionally include the downlink channel being a Physical Downlink Shared Channel.

Example 18 is a method for receiving data as illustrated in FIG. 10.

In Example 19 the subject-matter of Example 18 may optionally include storing the result of the combining as received data of the transmission process in the memory if the second transmission was not interfered by a communication resource deallocation.

In Example 20 the subject-matter of Example 18 or 19 may optionally include discarding the result of the combining if the second transmission was interfered by a communication resource deallocation.

In Example 21 the subject-matter of any one of Examples 18 to 20 may optionally include discarding the received data of the transmission process stored in the memory if the second transmission was not interfered by a communication resource deallocation.

In Example 22 the subject-matter of any one of Examples 18 to 21 may optionally include receiving one or more second transmissions of data of the transmission process and, for each of the one or more second transmissions of data, combining the data received in the second transmission with the data stored in the memory; determining whether the second transmission was interfered by a communication resource deallocation; and maintaining data storage of the received data of the transmission process in the memory as received data of the transmission process if the second transmission was interfered by a communication resource deallocation.

In Example 23 the subject-matter of any one of Examples 18 to 22 may optionally include determining whether the second transmission was interfered by a communication resource deallocation based on whether a communication resource deallocation message has been received.

In Example 24 the subject-matter of any one of Examples 18 to 23 may optionally include determining whether the second transmission was interfered by a communication resource deallocation based on whether a resource deallocation has been detected.

In Example 25 the subject-matter of Example 23 or 24 may optionally include the communication resource deallocation being a communication resource pre-emption and the communication resource deallocation message being a pre-emption indication.

In Example 26 the subject-matter of any one of Examples 18 to 25 may optionally include the second transmission being a retransmission according to the retransmission protocol.

In Example 27 the subject-matter of any one of Examples 18 to 26 may optionally include the retransmission protocol being a Hybrid Automatic Repeat Request protocol and the transmission process being a Hybrid Automatic Repeat Request process.

In Example 28 the subject-matter of any one of Examples 18 to 27 may optionally include checking whether the result of the combining is sufficient for decoding and freeing the memory from the received data of the transmission process if the result of the combining is sufficient for decoding.

In Example 29 the subject-matter of any one of Examples 18 to 28 may optionally include checking whether the result of the combining is sufficient for decoding by decoding the result of the combining and checking whether result of the decoding fulfills an error detection criterion.

In Example 30 the subject-matter of any one of Examples 18 to 29 may optionally include storing the result of the combining in a further memory and freeing the further memory if the second transmission was interfered by a communication resource deallocation.

In Example 31 the subject-matter of Example 30 may optionally include the memory being a transmission process buffer and the further memory being a temporary transmission process buffer.

In Example 32 the subject-matter of Example 29 may optionally include setting the temporary transmission process buffer as the transmission process buffer if the second transmission was not interfered by a communication resource deallocation.

In Example 33 the subject-matter of any one of Examples 18 to 32 may be performed by a mobile terminal of a mobile communication system and may optionally include the one or more first transmissions and the second transmissions being transmissions via a downlink channel of the mobile communication system.

In Example 34 the subject-matter of any one of Examples 18 to 33 may optionally include the downlink channel being a Physical Downlink Shared Channel.

According to a further example, a communication device receives a retransmission of data in a transmission process according to a retransmission protocol, combines data received in retransmission with data of the transmission process before the retransmission while keeping the data of the transmission process before the retransmission stored, determines whether the data retransmission was influenced by resource deallocation and if the data retransmission was influenced by resource deallocation uses the data of the transmission process before the retransmission as data of the transmission process and else uses the combination as data of the transmission process.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication device comprising:
a memory configured to store data received in one or more first transmissions of a transmission process according to a retransmission protocol;
a receiver configured to receive a second transmission of data of the transmission process;
a combiner configured to combine the data received in the second transmission with the data stored in the memory;
a determiner configured to determine whether the second transmission was interfered by a communication resource deallocation; and
a controller configured to maintain data storage of the received data of the transmission process stored in the memory as received data of the transmission process if the second transmission was interfered by a communication resource deallocation,
wherein the controller is configured to discard the received data of the transmission process stored in the memory if the second transmission was not interfered by a communication resource deallocation, and
wherein the determiner is configured to determine whether the second transmission was interfered by a communication resource deallocation based on whether the communication device has detected a resource deallocation by analyzing channel properties, log-likelihood ratios (LLR) properties, and/or interference estimations.

2. The communication device of claim 1, wherein the controller is configured to store the result of the combining as received data of the transmission process in the memory if the second transmission was not interfered by a communication resource deallocation.

3. The communication device of claim 1, wherein the controller is configured to discard the result of the combining if the second transmission was interfered by a communication resource deallocation.

4. The communication device of claim 1, wherein the receiver is configured to receive one or more second transmissions of data of the transmission process and the combiner, the determiner and the controller are configured to, for each of the one or more second transmissions of data,
    combine the data received in the second transmission with the data stored in the memory;
    determine whether the second transmission was interfered by a communication resource deallocation; and
        maintain data storage of the received data of the transmission process stored in the memory as received data of the transmission process if the second transmission was interfered by a communication resource deallocation.

5. The communication device of claim 1, wherein the determiner is configured to determine whether the second transmission was interfered by a communication resource deallocation based on whether the communication device has received a communication resource deallocation message.

6. The communication device of claim 5, wherein the communication resource deallocation is a communication resource pre-emption and the communication resource deallocation message is a pre-emption indication.

7. The communication device of claim 1, wherein the second transmission is a retransmission according to the retransmission protocol.

8. The communication device of claim 1, wherein the retransmission protocol is a Hybrid Automatic Repeat Request protocol and the transmission process is a Hybrid Automatic Repeat Request process.

9. The communication device of claim 1, wherein the controller is configured to check whether the result of the combining is sufficient for decoding and free the memory from the received data of the transmission process if the result of the combining is sufficient for decoding.

10. The communication device of claim 1, wherein the controller is configured to check whether the result of the combining is sufficient for decoding by decoding the result of the combining and checking whether result of the decoding fulfills an error detection criterion.

11. The communication device of claim 10, wherein the controller is configured to set a temporary transmission process buffer as the transmission process buffer if the second transmission was not interfered by a communication resource deallocation.

12. The communication device of claim 1, wherein the combiner is configured to store the result of the combining in a further memory and the controller is configured to free the further memory if the second transmission was interfered by a communication resource deallocation.

13. The communication device of claim 12, wherein the memory is a transmission process buffer and the further memory is a temporary transmission process buffer.

14. The communication device of claim 1, wherein the communication device is a mobile terminal of a mobile communication system and wherein the one or more first transmissions and the second transmissions are transmissions via a downlink channel of the mobile communication system.

15. The communication device of claim 14, wherein the downlink channel is a Physical Downlink Shared Channel.

16. A method for receiving data comprising:
    receiving data in one or more first transmissions of a transmission process according to a retransmission protocol;
    storing the data received in the one or more first transmissions in a memory; Receiving data in a second transmission of the transmission process;
    combining the data received in the second transmission with the data received in the one or more first transmissions;
    determining whether the second transmission was interfered by a communication resource deallocation;
    maintaining data storage of the data received in the one or more first transmissions as received data of the transmission process if the second transmission was interfered by a communication resource deallocation;
    discarding the received data of the transmission process stored in the memory in response to determining the second transmission was not interfered by a communication resource deallocation; and
    determining whether the second transmission was interfered by a communication resource deallocation based on whether the communication device has detected a resource deallocation by analyzing channel properties, log-likelihood ratios (LLR) properties, and/or interference estimations.

17. The method of claim 16, comprising storing the result of the combining as received data of the transmission process in the memory if the second transmission was not interfered by a communication resource deallocation.

18. The method of claim 16, comprising discarding the result of the combining if the second transmission was interfered by a communication resource deallocation.

19. A communication device comprising:
    a memory configured to store data received in one or more first transmissions of a transmission process according to a retransmission protocol;
    a receiver configured to receive a second transmission of data of the transmission process;
    a combiner configured to combine the data received in the second transmission with the data stored in the memory;
    a determiner configured to determine whether the second transmission was interfered by a communication resource deallocation; and
    a controller configured to maintain data storage of the received data of the transmission process stored in the memory as received data of the transmission process if the second transmission was interfered by a communication resource deallocation, and
    wherein the determiner is configured to determine whether the second transmission was interfered by a communication resource deallocation based on whether the communication device has detected a resource deallocation by analyzing channel properties, log-likelihood ratios (LLR) properties, and/or interference estimations.

* * * * *